April 5, 1949.                      C. W. MORRIS                        2,466,465
                                 PRESSURE REGULATOR
Filed July 30, 1945                                                  3 Sheets-Sheet 1
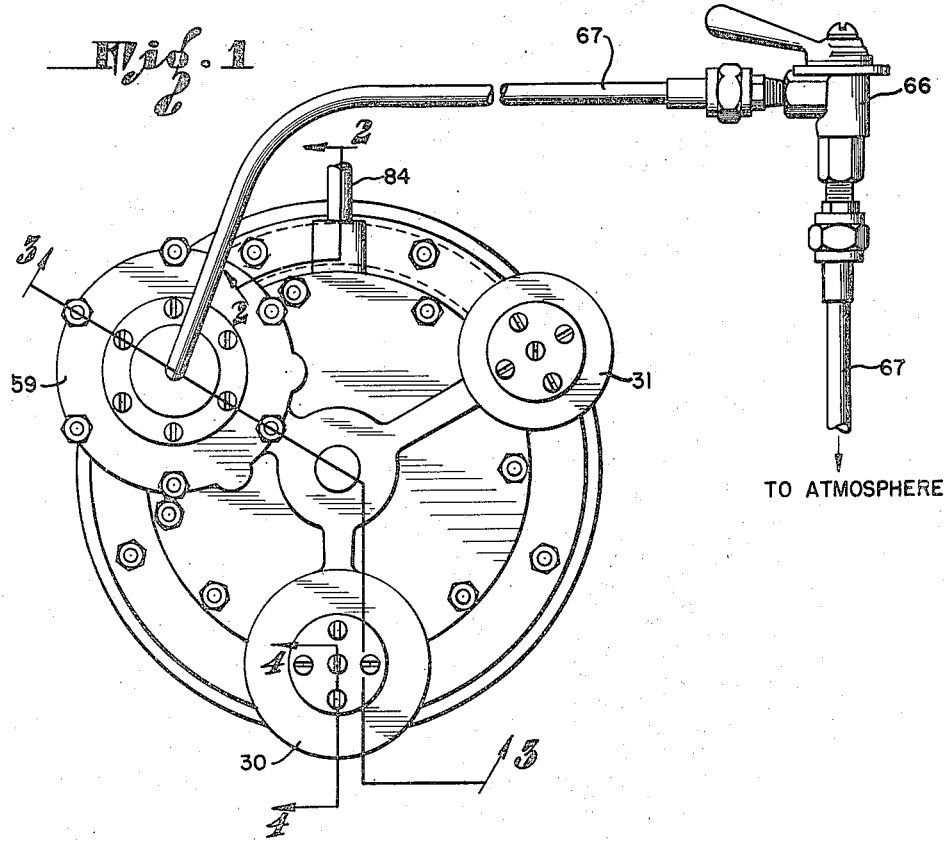
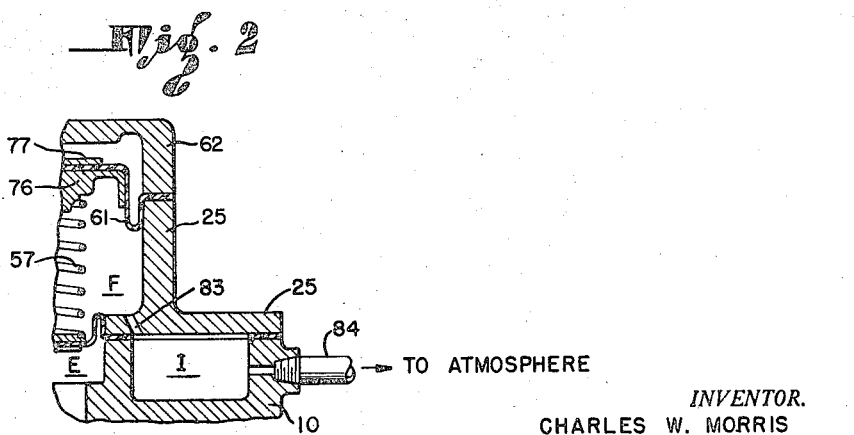
INVENTOR.
CHARLES W. MORRIS
BY
ATTORNEY

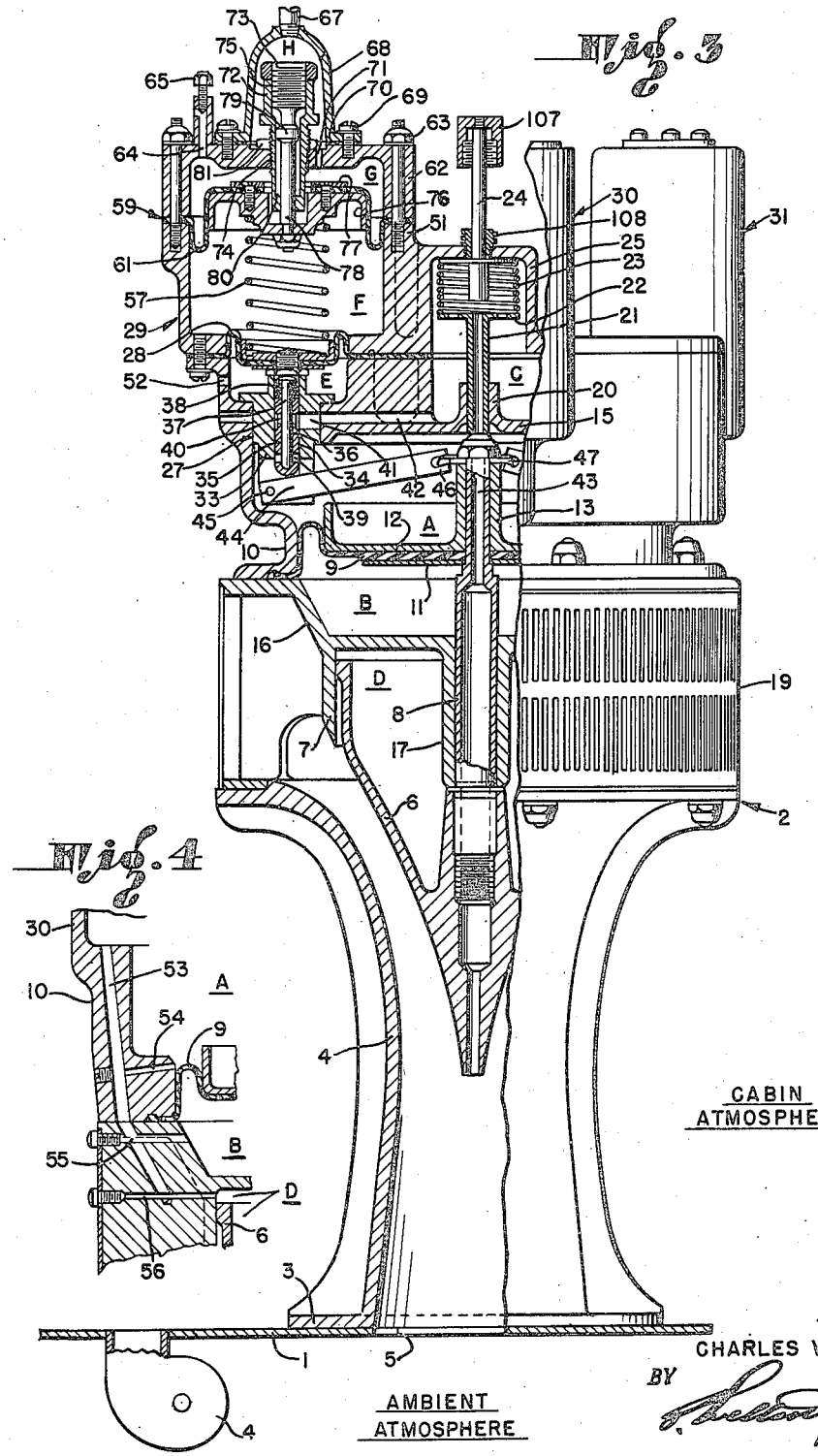

April 5, 1949. C. W. MORRIS 2,466,465
PRESSURE REGULATOR
Filed July 30, 1945. 3 Sheets-Sheet 3
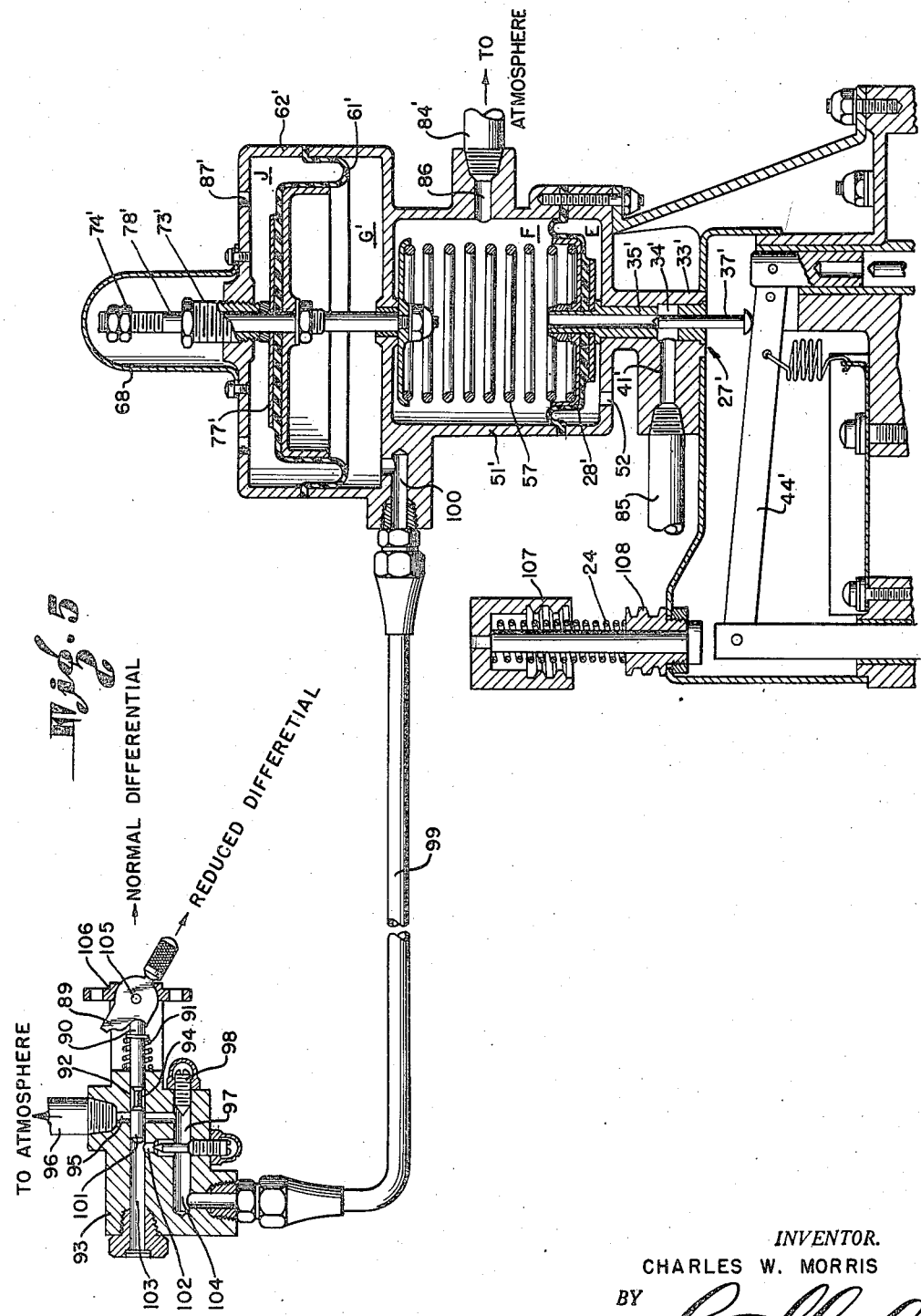
Fig. 5
INVENTOR.
CHARLES W. MORRIS
BY
ATTORNEY Patented Apr. 5, 1949

2,466,465

UNITED STATES PATENT OFFICE 2,466,465

PRESSURE REGULATOR

Charles W. Morris, Los Angeles, Calif., assignor to The Garrett Corporation, Airesearch Manufacturing Company Division, Los Angeles, Calif., a corporation of California Application July 30, 1945, Serial No. 607,763

7 Claims. (Cl. 98—1.5)

This invention relates to apparatus for controlling the ventilation, under pressure, of the atmosphere within an enclosure such as an aircraft cabin. It is particularly applicable to military aircraft, in which a number of serious problems are met with in the event of a major perforation of the wall of a pressurized cabin during combat operations. If the area of perforation is sufficiently large, the air will escape from the cabin faster than the supercharging apparatus can pump fresh air into the cabin to replace it. Consequently, cabin pressure may drop to a lower level at a rate of change greater than that at which the occupants can continue to maintain normal and rational bodily and mental functioning.

The problem of maintaining rational functioning of the military personnel of a combat plane under such conditions can be solved by providing equipment for the controlled supply of breathing oxygen, and such equipment is available. Thus a plane may continue to operate at altitudes above the limit where ambient atmosphere is capable of furnishing an adequate oxygen supply for breathing purposes. However, such equipment does not solve the other problems mentioned above. The seriousness of these problems is proportional to the magnitude of the differential between cabin and ambient pressure for which the pressure regulating apparatus is set to operate at the higher altitudes. Consequently, these problems may be dealt with by providing, for use in conjunction with the oxygen apparatus, means for reducing the differential during combat operations, and the general object of the present invention is to provide a pressure regulating mechanism including means whereby the differential between cabin and ambient pressure normally called for at high altitudes may be temporarily reduced, for combat operations, to a predetermined minimum and may subsequently be restored to its normally high level.

A further object of the invention is to provide a pressure regulating system incorporating a differential changer, the operation of which may be initiated manually by the pilot, and which is then adapted to automatically change the differential from a predetermined high limit to a predetermined low limit, or vice versa, depending upon the direction in which the manual control is set for operation.

When a plane enters combat, it is desirable that the change from high to low differential be brought about with moderate rapidity, in order that the low differential may be arrived at before the plane actually becomes subject to possible perforations from enemy fire. Should the wall of the cabin be ruptured to an extent such as to cause substantially instantaneous decompression (commonly referred to as explosive decompression), the effect upon the occupants would be injurious to an extent proportional to the altitude of the plane, and, at extremely high altitudes, could be fatal. Accordingly, the invention contemplates the controlled reduction of differential at a maximum rate of rapidity consistent with the avoidance of injurious consequences.

Excessive rapidity of increase in differential also produces deleterious effects upon the personnel of the plane. Too rapid an increase in cabin pressure can seriously effect the middle ear of an occupant. A further object of the invention, therefore, is to provide a cabin pressure regulating system capable of effecting a considerably slower change from low to high differential than the change to low from high differential. The extent of the injurious effect of rapid decompression depends somewhat upon the value of the differential at its lower limit. For this, and other reasons, it is desirable to adjust the value of this limit to meet varying conditions. It is also desirable to adjust the upper or maximum limit to which the differential may be raised—i. e., the normal value of the differential at high altitudes—to correspond to the structural load limit of the cabin walls. A further object of the invention is to provide a regulator, which, in addition to the above described features, permits the adjustment of both the upper and lower limits of differential.

Another object of the invention is to provide a differential changing control which is adapted to override a control which normally operates to maintain a fixed (normal) differential between cabin and ambient pressures in at least one stage of operation of the regulating system. Thus the regulator would normally maintain a maximum differential in this stage of operation, but would be adapted, under manual control, to shift from high to low and back to high differential while operating under external atmospheric conditions normally calling for high differential.

The invention is particularly applicable to a commonly used method of pressurizing in which cabin pressure is permitted to remain substantially the same as atmospheric pressure until a predetermined altitude has been reached, is maintained at a substantially constant level between that altitude and a second predetermined and higher altitude, and, above said second predetermined altitude, is maintained at a substantially fixed normal differential relative to external atmosphere. In actual operation in such a system, the differential changer will override not only the normal differential control, but also the isobaric control in that portion of the isobaric range wherein there is developed a differential of cabin over ambient pressure exceeding the minimum differential limit determined by the differential changer of the present invention.

Another object of the invention is to provide differential changing control mechanism which is capable of being adjusted to various rates of differential change, both in the differential reducing and in the differential increasing operations, in order that these changes may be adjusted to best meet the requirements of varying general conditions of operation.

Further objects and advantages of the invention will be brought out in the following part of the specification.

Referring to the drawings which are for illustrative purposes only,

Fig. 1 is a plan view of a regulating system embodying the invention;

Fig. 2 is a detail sectional view of the same taken on the line 2—2 of Fig. 1;

Fig. 3 is a side elevation, partially in axial section, of the regulator of the system shown in Fig. 1, taken as indicated by the line 3—3 of that figure;

Fig. 4 is a detail sectional view taken on the line 4—4 of Fig. 1;

Fig. 5 is a schematic view, largely in section, of a regulating system embodying a modification of the invention.

The regulating system of Fig. 1 embodies a regulator unit, shown in Fig. 3, which is adapted to be positioned within the cabin atmosphere, indicated by lettered representation on the drawing, and to control the outflow from the cabin through the wall thereof shown at 1 to ambient atmosphere indicated on the drawing by the lettered representation. The regulator embodies a main valve casing which is indicated generally at 2 and which has a flange 3 for attachment to the wall 1 of the cabin. The casing 2 has an outlet throat 4 which is registered with an outlet 5 in the cabin wall 1. The outflow through the outlet 5 is controlled by a valve element 6 slidably mounted within a skirt 7 forming part of an annular upper wall 16 of the casing member 2. The valve 6 is suspended upon a tubular shaft 8 which in turn is carried by a diaphragm 9, the periphery of which is clamped between the casing member 16 and a waist housing member 10. The inner region of the diaphragm 9 is clamped between a washer 11 and a cup 12, the latter having a hub 13 secured upon the shaft 8. The waist housing 10 has an upper wall 15 which cooperates with the diaphragm 9 to define a control member chamber A. The diaphragm 9 cooperates with the upper casing member 16 of the valve housing 2 to define a chamber B. The shaft 8 is slidably mounted in a bearing sleeve 17, formed in the upper casing wall 16. The wall 16 is connected to the throat 4 by a grille 19 which defines a plurality of inlets for the flow of cabin air into the valve casing 2.

In a bearing collar 20 in the wall 15 is slidably mounted a tube 21, having at its upper end a head 22 which is subjected to spring pressure by a coil spring 23, the upper end of which is abutted against a manual lock-out pin 24 mounted in a casing head 25. The lower end of the tube 21 constantly engages and is sealed against the upper end of the tubular valve shaft 8, thus transferring the spring load to the diaphragm 9.

The diaphragm 9 responds to the opposing forces produced by cabin pressure which is applied to the chamber B and the combination of the force applied by the spring 23 and the force resulting from the variable air pressure in the chamber A, which latter pressure may range between cabin pressure and atmospheric pressure under the control of a series of control elements, each including a pilot valve 27 and pressure responsive control means (such as the diaphragm 28 of the differential control unit 29) for operating the same. In addition to the differential control 29, these several control units may include an isobaric control 30 for effecting an isobaric stage of operation, and a ratio control 31 for establishing a substantially fixed ratio between cabin and ambient pressure in another stage of operation. It will be noted that these several controls are arranged around the periphery of the housing cap 25 of the regulator, substantially 120° apart. Each of the pilot valves 27 is adapted to control the communication between the low pressure chamber C and the control chamber A in a manner to control, in a respective stage of regulator operation, the position of the valve element 6, whereby to control the pressure within the cabin. The pilot valve of each control unit includes a valve casing 33 set into the wall 15 and having a bore 34 in which is slidably mounted a valve sleeve 35 having a bore 36. A metering pin 37 is slidably mounted in the bore 36 and is adapted, when downwardly projected by the control means, to close the bore 36 against the passage of air from a port or ports 39 in the lower end of the sleeve 35, communicating with the chamber A to registering ports 40 and 41 in the sleeve 35 and valve casing 33 respectively. When the valve pin 37 is retracted (by a spring 38 engaged between the upper end of the sleeve 35 and the head of the valve pin and maintaining such head constantly in contact with the bottom of the diaphragm 28), communication between the bore 36 and the port 40 will be established, thus connecting the chamber A, through a duct 42, with a low pressure chamber C defined between the waist housing member 10 and the cap member 25. The low pressure chamber C is constantly in communication with the throat 4 through a passage 43 collectively defined by the hollow shaft 8 and the spring loading tube 21. When any one of the pilot valves opens, air will flow from the chamber A to the chamber C and there will be a resulting pressure drop in the chamber A, permitting the force resulting from the pressure in the chamber B to move the diaphragm 9 upwardly, thus moving the main control valve 6 in opening direction. As a further consequence of the upward movement of the diaphragm 9, a plurality of follow-up levers 44, pivoted at 45 to the respective valve casings 33 and each having a fork 46 embracing the rim of a disc 47 carried by the hub member 13, will be shifted about their pivots 45, causing the valve sleeve 35 to move upwardly against the force of the spring 38. The "follow-up" action thus produced will react upon the pilot valve responsible for the main valve opening movement thus described, in a manner to close such pilot valve without waiting for the response of its respective pressure responsive control element to the altered cabin pressure condition resulting from the changed position of the main valve 6. The purpose of this follow-up action is to avoid hunting, which would be produced by lag in response of the pressure responsive control element to the changed condition.

Cabin pressure is transmitted (see Fig. 4) from the interior of the casing of the isobaric control 30 through a duct 53 in the lateral wall of the waist casing member 10 to a series of bores 54, 55, and 56, communicating respectively with the control chamber A, the chamber B, and the space D between the valve element 6 and the casing wall 16. The bore 55, which is of adequate diameter for the purpose, maintains cabin pressure in the chamber B at all times. The restricted bore 54 permits a slow bleeding of cabin pressure to the chamber A when all of the pilot valves are closed, and the force resulting from the resulting build up of cabin pressure, or pressure approaching cabin pressure, in the chamber A, is utilized for moving the valve element 6 to or toward the closed position. The degree to which the pressure in the chamber A is reduced to atmospheric pressure depends upon the degree of opening of the pilot valve or pilot valves, and the resulting ratio between the rate of entry of air into the chamber A through the bleed opening 54 and the egress of the air from the chamber A to the pilot valve.

Differential control 29 comes into operation after the stage of isobaric operation in which the isobaric control maintains the cabin pressure at a substantially constant level while ambient pressure progressively decreases as the plane attains a higher altitude. During this stage of operation, all of the pilot valves are nearly closed, the pressure in the chambers A and B are nearly equal, and the diaphragm 9 constantly maintains the valve 6 slightly open, sufficiently to allow adequate ventilation and yet maintain the predetermined isobaric cabin pressure level.

As a result of the gradual decrease of ambient pressure while cabin pressure is maintained substantially constant, an increasing differential in cabin pressure over ambient pressure will be built up, and this differential will be reflected in the chambers E and F below and above the diaphragm 28 respectively. When the differential attains a predetermined maximum, the differentially controlled pilot valve 27 will open to permit a reduction in pressure in the chamber A above the main diaphragm 9, thus permitting the main valve 6 to open sufficiently to maintain the said predetermined differential between cabin and ambient pressure throughout the stage of normally differential control.

In the differential control unit 29, cabin pressure is maintained in the chamber E below the diaphragm 28 by a suitable connection between the chamber E and cabin atmosphere, such as, for example, the aperture 52, in the casing member 10. The force resulting from this pressure, acting against the under side of the diaphragm 28, is balanced against the combination of the force of the spring 57 exerted against the upper side of the diaphragm 28 and force resulting from ambient air pressure, which is maintained in the chamber F by a suitable connection to atmosphere, shown in Fig. 2, and which will be referred to hereinafter in more detail.

To effect a change in differential, the loading of the spring 57 is changed by the differential changing mechanism, which is indicated generally at 59. When the loading of the spring 57 is relatively light, the value of the differential between air pressures in the chambers E and F respectively, required for opening the valve 27, will be lower than the value of the differential between these air pressures required to open the valve when the loading of the spring 57 is relatively high. Consequently, with a low spring loading, the differential control unit will maintain a relatively low differential between cabin and ambient pressure and with a high spring loading, the differential control unit will maintain a relatively high differential between cabin and ambient pressures.

The differential changer embodies a diaphragm 61, the periphery of which is clamped between the lower casing member 51, formed in the cap 25, of the control housing and a cap member 62 which is secured to the casing member 51 by securing elements 63. The chamber F is defined between the casing member 51 and the diaphragm 61. Defined between the diaphragm 61 and the cap member 52 is a differential changer chamber G in which cabin pressure is normally maintained, cabin air being permitted, during the differential increasing operation, to bleed into the chamber G through an orifice 64 at a restricted rate which may be varied by changing the adjustment of a metering screw 65 cooperating with the orifice 64.

Reduction in pressure in the chamber G, in order to reduce the differential, is effected by opening a petcock 66 which normally closes an air line 67, one end of which communicates with atmosphere as indicated, and the other end of which communicates with a chamber H defined between the cap 62 and a smaller cap 68 secured to the cap 62 by screws 69 and sealed by a gasket 70. Air may flow from the chamber G to the chamber H through a moderately restricted aperture 71 in the cap 62, the aperture 71 being calibrated so as to give a rate of reduction in pressure which is sufficiently rapid to produce the desired rapidity of differential change, and yet is sufficiently extended to avoid the harmful effect of practically instantaneous decompression in the cabin. The bleed aperture 71 may if desired be controlled by a metering pin, as will be pointed out more specifically hereinafter in connection with the modified form of the invention. The flow through the aperture 71 is considerably faster than the flow through the bleed aperture 64, thus giving a relatively rapid differential reduction rate and a relatively slow differential increase rate. Also, the restriction of the aperture 64 makes it possible for the pressure in the control chamber G to be substantially equalized with atmospheric pressure despite the inflow through the aperture 64.

The limit to which the differential is adjusted may be varied by changing the setting of a pair of adjusting screws 72 and 73, the adjusting screw 72 being tubular and being threaded into the cap 62 at 74, and the adjusting screw 73 being threaded into the head of the screw 72 at 75. Secured to the cup 76 (between which, and a washer 77, the diaphragm 61 is clamped) is a stud 78 provided at its upper end with a head 79. The head 79 is adapted to engage the screw 73 to determine the lower limit of differential change and to engage a shoulder 80 at the lower end of the tubular screw 72 in order to determine the upper limit of differential change. It will be now apparent that the position of the shoulder 80 with reference to the cap 62 may be varied by rotating the adjusting screw 72 in the cap 62 in order to vary the upper limit and that the screw 73 may be rotated inside of the screw 72 in order to vary the magnitude of differential change between the two limits and thereby to also vary the lower limit.

Communication between the chamber F and atmosphere is made through a diagonal bore 83 extending from the chamber F to an arcuate chamber I (see Fig. 2) defined between the waist housing member 10 and the cap 25, and a tube 84 attached to the housing member 10 and communicating with the chamber I at one end and with atmosphere at its other end as indicated. The arcuate chamber I may serve the additional function of providing for an atmospheric connection to the ratio control unit 31.

In the form of the invention shown in Fig. 5 the basic regulator mechanism is similar in principle to that shown in Fig. 4, and consequently only a portion thereof, referred to by the same numerals as those applied to similar parts in previous figures, is shown. The valve 27' is similar to the valve 27 with the exception that the metering pin 37' engages the follow-up lever 44' and the valve sleeve 35' is attached to the diaphragm 28' and forms a path of communication between the chamber F and the chamber A above the main diaphragm (connected to the valve chamber 34' by a tube 85 and a bore 41' in the valve casing 33'). The connection of the chamber F with atmosphere is made through a tube 84' connected directly to an aperture 86 in the side wall of the differential control housing member 51'.

Cabin pressure is constantly applied to the chamber J defined between the upper side of the diaphragm 61' and the cap 62' through unrestricted openings 87' in the cap 62' and variable pressure is applied in the control chamber G' which, in this case, is below the diaphragm 61'.

Increase in differential, in this form of the invention, is effected by reducing the pressure in the control chamber G' to substantially atmospheric pressure, this being accomplished by shifting a control lever 88 to the position designated "normal differential" in Fig. 5. In this position a cam member 89 on the lever 88 moves a metering pin 90 inwardly, against the yielding resistance of a spring 91, in a bore 92 in the control valve casing 93, thus causing a reduced stem portion 94 of the metering pin 90 to register with a bore 95 in the casing 93 and thereby establish communication between an air line 96, connected to atmosphere as indicated, and a bore 97 in the control valve casing 93, past an adjustable metering pin 98, the bore 97 in turn being connected to a tube 99 and a duct 100 in the differential control housing 51' to the chamber G'. Thus the pressure in the chamber G' is permitted to equalize with atmospheric pressure at a rate determined by the setting of the metering pin 98. By rotating the metering pin 98, this rate of equalization may be varied. The reduction of pressure in the chamber G' permits the force resulting from the cabin pressure exerted against the upper side of the diaphragm 61' to move the diaphragm 61' downwardly, compressing the spring 57 and thus increasing the differential.

When the control lever 88 is moved to the "reduced differential" position in which it is shown in Fig. 5, the cam 89 permits the metering pin 90 to be retracted by the spring 91, thus moving a head 101 on the end of the metering pin 90 to a position closing the bore 95 and opening a port 102 (closed by the head 101 when the control valve is in the "normal differential" position) so as to establish communication between the chamber G' and cabin atmosphere through a bore 103 in the casing 93 and the bore 97, past a metering pin 104 which is adjustable so as to vary the rate of flow through the port 102. The flow through the port 102 is less restricted than the flow through the port 95. Consequently, the rate at which air may flow into the chamber G' to raise the pressure therein to substantially cabin pressure, is faster than the rate at which the air may be evacuated from the chamber G'. Raising the pressure in the chamber G' to substantially cabin pressure balances the pressure against the upper side of the diaphragm 61' and permits the spring 57 to expand until the washer 77' engages the adjusting screw 73', which determines the lower differential limit. Engagement of an adjustable nut 74' threaded onto the upper end of the stud 78' with the upper end of the screw 73', determines the upper differential limit.

The control lever 88 is pivoted at 105 to a fixture 106 which may be attached to the pilot's instrument board. Thus the differential can be quickly changed by manual control at the pilot's station.

The function of the lock out pin 24 is to override the regulator controls. The pin 24 has an internally threaded head 107 adapted to be attached to a male threaded boss 108 on the cap 25, thus to hold the pin 24 in a depressed position with its inner end engaging the spring loaded tube 21 and holding the valve 6 in closed position.

I claim as my invention:

1. Mechanism for controlling the pressure of the atmosphere within an aircraft cabin, comprising: an airflow valve for controlling the pressure within the cabin; a pressure responsive control element for controlling the operation of said valve; means for controlling said pressure responsive control element so as to maintain a differential between cabin and ambient pressure at high flight altitudes; pneumatic means for imposing different loads upon one side of said pressure responsive control element so as to change the value of the differential; said pressure responsive control element and pneumatic means comprising a pair of diaphragms defining between them a chamber in which there is maintained a low pressure, means cooperating with said pressure responsive element to define on the other side thereof a chamber in which a higher pressure is maintained, and means cooperating with the diaphragm of said pneumatic means on the other side thereof to define a control chamber in which the pressure is changed for changing the differential; and valve means for selectively varying the pressure in said control chamber and thus subjecting the diaphragm of said pneumatic means to varying pressures, one of which is related to cabin pressure and the other of which is related to ambient pressure.

2. Mechanism for controlling the pressure of the atmosphere within an aircraft, comprising: an airflow valve for controlling the pressure within the cabin; differential control means including a pressure responsive control element for controlling the operation of said valve, said pressure responsive control element comprising a diaphragm, and means defining on opposite sides thereof a pair of chambers, in one of which cabin pressure is maintained and in the other of which atmospheric pressure is maintained, and a compression spring in the last mentioned chamber engaging said diaphragm to exert thereagainst a force which is added to the force resulting from said atmospheric pressure; pneumatic means for controlling said pressure responsive control element so as to maintain a differential between cabin and ambient pressure at high flight altitudes, said pneumatic means comprising a diaphragm defining one wall of the last mentioned chamber, said diaphragm having a shaft extending into said last mentioned chamber and exerting pressure against said spring, and means defining upon the opposite side of said last mentioned diaphragm a chamber, remote from said pressure responsive element, in which substantially cabin pressure is normally maintained, the pressure in the last mentioned chamber being changeable from said substantially cabin pressure to substantially atmospheric pressure; and valve means for controlling the pressure in said last mentioned chamber so that said pressure will be said substantially cabin pressure or said substantially atmospheric pressure, there being metering valve means for controlling the rate of change of pressure in said last mentioned chamber in at least one direction of operation.

3. A differential changing mechanism for a pressure regulator for aircraft cabins having differential control means including a movable wall subjected on opposite sides to cabin pressure and atmospheric pressure respectively, and having yielding means urging said wall in one direction, comprising: a movable pressure responsive member adapted to be subjected on one side to atmospheric pressure; means defining a control pressure chamber on the opposite side of said member whereby said side of said member is subjected to the pressure in said chamber; a calibrated restricted inlet for said chamber, said inlet being adapted to admit cabin pressure into said chamber; a restricted outlet for said chamber adapted to be connected to atmospheric pressure, said outlet having a greater capacity than said inlet; and valve means controlling said outlet, said outlet being sufficiently greater than the inlet so as to permit a drop in pressure in said chamber at a relatively rapid rate when said valve means is open, and said inlet providing for a build-up of pressure in the chamber at a slower rate when the valve is closed.

4. In combination with a pressure regulator for aircraft cabins or the like having a pressure differential control including a spring loaded pressure responsive member subjected to cabin pressure on one side thereof and ambient pressure on the opposite side thereof, pneumatic means incorporated in and superimposed upon said pressure differential control adapted by manual initiation to automatically provide a rapid decrease in differential pressure or a slower increase to the normal predetermined differential, said pneumatic means comprising: a pressure responsive diaphragm operatively connected to said spring loaded pressure responsive member for altering the spring loading thereon, said diaphragm being subjected on one side to one of the pressures in said pressure differential control; means defining a control pressure chamber on the other side of said diaphragm; an inlet orifice for said pressure chamber for admission of cabin pressure; an outlet orifice connecting said pressure chamber to ambient pressure; and manually operated valve means associated with said outlet orifice for opening or closing said connection to ambient pressure thereby controlling the pressure in said pressure chamber and on said diaphragm and thus controlling the spring loading on the pressure responsive member of said pressure differential control.

5. In combination with a pressure regulator for aircraft cabins or the like having a pressure differential control including a spring loaded pressure responsive member subjected to cabin pressure on one side thereof and ambient pressure on the opposite side thereof, pneumatic means incorporated in and superimposed upon said pressure differential control adapted by manual initiation to automatically provide a rapid decrease in differential pressure or a slower increase to the normal predetermined differential, said pneumatic means comprising: a pressure responsive diaphragm operatively connected to said spring loaded pressure responsive member for altering the spring loading thereon, said diaphragm being subjected on one side to one of the pressures in said pressure differential control; means defining a control pressure chamber on the other side of said diaphragm; an inlet orifice for said pressure chamber for admission of cabin pressure; an outlet orifice connecting said pressure chamber to ambient pressure; and manually operated valve means associated with said outlet orifice for opening or closing said connection to ambient pressure thereby controlling the pressure in said pressure chamber and on said diaphragm and thus controlling the spring loading on the pressure responsive member of said pressure differential control; said inlet and outlet orifices being of sufficiently different size to cause a relatively rapid decrease in cabin pressure when said valve is in one position and a relatively slow increase in cabin pressure when said valve is in the other position.

6. In combination with a pressure regulator for aircraft cabins or the like having a pressure differential control including a spring loaded pressure responsive member subjected to cabin pressure on one side thereof and ambient pressure on the opposite side thereof, integral pneumatic means incorporated in and superimposed upon said pressure differential control adapted by manual initiation to automatically provide a rapid decrease in differential pressure followed by a slower return to the normal predetermined differential, said integral pneumatic means comprising: a pressure responsive diaphragm operatively connected to said spring loaded responsive member and subjected on one side to one of the pressures in said pressure differential control; means defining a control pressure chamber on the other side of said diaphragm; an adjustable inlet orifice for said pressure chamber for admission of cabin pressure; an adjustable outlet orifice for said chamber connected to the ambient atmosphere; and manually operated valve means capable of two positions associated with said outlet orifice for opening and closing said connection to ambient atmosphere; said orifices being of sufficiently different sizes to cause relatively rapid decrease in cabin pressure when said valve is in one position and a relatively slow increase in cabin pressure when said valve is in the other position.

7. In combination with a pressure regulator for aircraft cabins or the like having a pressure differential control including a spring loaded pressure responsive member, subjected to cabin pressure on one side thereof and ambient pressure on the opposite side thereof, integral pneumatic means incorporated in and superimposed upon said pressure differential control adapted by manual initiation to automatically provide a rapid decrease in differential pressure followed by a slower return to the normal predetermined differential, said integral pneumatic means comprising: a pressure responsive diaphragm operatively connected to said spring load pressure responsive member and subjected on one side to one of the pressures in said pressure differential control; means defining a control pressure chamber on the other side of said diaphragm; an adjustable inlet orifice for said pressure chamber for admission of cabin pressure; an adjustable outlet orifice connected to the ambient atmosphere for said chamber; manually operated valve means associated with said outlet orifice for opening and closing said connection to ambient atmosphere, said orifices being of sufficiently different sizes to cause relatively rapid decrease in cabin pressure when said valve is in one position and a relatively slow increase in cabin pressure when said valve is in the other position and said orifices being adjustable so as to selectively control the rates of increase and decrease in cabin pressure; and adjustable means carried by said diaphragm for predetermining the upper and lower limits of differential pressures.

CHARLES W. MORRIS.

REFERENCES CITED

The following references are of record in the file of this patent:

UNITED STATES PATENTS

| Number | Name | Date |
|---|---|---|
| 2,208,554 | Price | July 16, 1940 |
| 2,307,199 | Cooper | Jan. 5, 1943 |
| 2,391,197 | Schwein | Dec. 18, 1945 |
| 2,413,027 | Maxson | Dec. 24, 1946 |
| 2,419,707 | Cooper et al. | Apr. 29, 1947 |
| 2,424,491 | Morris | July 22, 1947 |
| 2,424,764 | Marshall, Jr. | July 29, 1947 |
| 2,425,000 | Paget | Aug. 5, 1947 |
| 2,433,206 | Dube | Dec. 23, 1947 |

Certificate of Correction

Patent No. 2,466,465.

April 5, 1949.

CHARLES W. MORRIS

It is hereby certified that errors appear in the printed specification of the above above numbered patent requiring correction as follows:

Column 6, line 20, for "member 52" read *member 62*; column 7, line 29, for "sdie" read *side*;

and that the said Letters Patent should be read with these corrections therein that the same may conform to the record of the case in the Patent Office.

Signed and sealed this 27th day of September, A. D. 1949.

[SEAL]

THOMAS F. MURPHY,
*Assistant Commissioner of Patents.*